United States Patent [19]

Beg

[11] Patent Number: 4,905,117

[45] Date of Patent: Feb. 27, 1990

[54] CIRCUIT AND METHOD FOR DC CONTENT PROTECTION OF PARALLEL VSCF POWER SYSTEMS

[75] Inventor: Mirza A. Beg, Lima, Ohio

[73] Assignee: Westinghouse Electric Corp., Pittsburgh, Pa.

[21] Appl. No.: 240,185

[22] Filed: Sep. 2, 1988

[51] Int. Cl.$^4$ .......................................... H02H 7/00
[52] U.S. Cl. ...................................... 361/93; 361/86; 307/57; 307/85
[58] Field of Search ....................... 307/53, 55, 57, 58, 307/82, 85–87, 88; 361/67, 78, 85, 86, 87, 93; 323/276; 363/69, 70, 71, 164

[56] References Cited

U.S. PATENT DOCUMENTS

| | | | |
|---|---|---|---|
| 4,173,774 | 11/1979 | Hyvarinen et al. | 361/87 |
| 4,370,702 | 1/1983 | Shuey et al. | 363/42 |
| 4,443,842 | 4/1984 | Jessee | 363/41 |
| 4,500,837 | 2/1985 | Shuey et al. | 324/102 |
| 4,587,604 | 5/1986 | Nerone | 307/87 |
| 4,728,806 | 3/1988 | Baker et al. | 307/43 |
| 4,731,690 | 3/1988 | Beg et al. | 361/78 |
| 4,766,327 | 8/1988 | Fox | 307/57 |

Primary Examiner—Derek S. Jennings
Assistant Examiner—Jeffrey A. Gaffin
Attorney, Agent, or Firm—R. P. Lenart

[57] ABSTRACT

A method of selectively isolating faulty channels in a parallel electric power system having at least two controllable AC power sources includes the steps of producing a DC content signal representative of the magnitude of DC voltage in an AC output of one of the power sources and producing a differential current signal representative of differential DC current flowing in connected phases of the power sources. The DC content and differential current signals are combined to produce an error signal which is used to control the operation of the first power source, thereby reducing the magnitude of DC voltage in its output. When the error signal exceeds a predetermined threshold level, a trip signal can be produced and used to selectively isolate a failed channel in the power system. Following isolation of the channels, the differential current signal is disabled such that the error signal is only representative of the DC content signal for split channel operation.

6 Claims, 6 Drawing Sheets

CIRCUIT AND METHOD FOR DC CONTENT PROTECTION OF PARALLEL VSCF POWER SYSTEMS

BACKGROUND OF THE INVENTION

This invention relates to DC link, variable speed constant frequency (VSCF) power systems having at least two parallel connected channels, and more particularly, to a method and circuit for controlling the DC content in the output of such systems and for selectively isolating channels which contribute excessive DC content to the parallel system.

DC link VSCF electrical systems include a generator which is driven at a variable speed, and produces a variable frequency AC output voltage. This AC output voltage is rectified and fed to a pair of DC link conductors. An inverter receives voltage from the DC link conductors and converts it to a constant frequency DC output. Electronic switches in the inverter are paired so that conduction by one switch in a pair generates the positive half cycle of the output current waveform and conduction by the other switch in the pair generates the negative half cycle. In order to generate an ideal waveform, each switch pair must be on for one-half of the total duration of each cycle of the output waveform and off for one-half of the time. However, due to variations in the characteristics of the switches, such as switching time and saturation voltage, it is inevitable that one switch in a pair will generate more volt-seconds per cycle than the other. Although this difference in volt-seconds generated is usually very small, over a period of time, it results in an introduction of a DC component to the output waveform Techniques and circuits for sensing this DC component and modifying the inverter switching to minimize DC content are illustrated in U.S. Pat. Nos. 4,500,837 and 4,370,702. Although those circuits provide suitable DC content correction and control for single channel systems, parallel connected VSCF systems present special situations which are not adequately handled by existing DC content control circuits.

In particular, it has been found that splitting the channels of a parallel VSCF system as a result of excessive DC content in the output, did not guarantee that only the culprit channel would be tripped. To understand this problem, it is instructive to consider a parallel VSCF system consisting of many VSCF channels. When the system is running in a parallel configuration, all of the channels connected to a parallel bus will try to bring the DC content at their sensing points (normally the point of regulation) back to their pre-paralleled DC content levels. The actual DC contents sensed by individual paralleled VSCF channels will be different if there are interconnecting feeders between the various points of regulation. Therefore, each parallel channel will try to regulate its post paralleled DC content at its sensed point of regulation to the pre-paralleled value.

If one of the VSCF channels has a high, but below trip threshold, DC content before it is connected to the paralleled bus, that channel would attempt to introduce a higher DC content on all of the good channels because of the low DC resistance of connecting feeder cables. The good channels would then try to reduce their respective DC content back to their pre-paralleled values. Since existing DC content correction loops have infinite gain, when attempting to regulate the DC content, some of the DC content correction circuits in the good channels may saturate. Eventually, an equilibrium would be reached and none of the paralleled channels would have a high enough DC content to warrant tripping. Therefore, the system would continue to run in the paralleled mode.

Now, if the channels of the system are to be split or a good channel is to be taken off the paralleled bus, the following scenario may occur. The good channels with the post-parallel saturated DC content controls would take some time to recover from saturation. During that time, those channels would cause maximum DC content at their sensing points. During recovery of the DC content correction loops, the DC content at the sensing points will be driven to the dynamic limit of the DC content correcting loop. Depending upon the degree of saturation, the time taken by the saturation channels to recover may exceed the trip threshold resulting in tripping of the otherwise good channels.

Another fact situation can also result in the tripping of good channels. For example, suppose that one channel on the paralleled bus has developed a problem in its DC content control. This problem, had it occurred in the isolated split channel mode, would have caused a DC content beyond the trip threshold and subsequent tripping of that channel. In the parallel mode, this bad channel would cause a higher DC content at the sensing points of all good channels because of the low DC resistance of the interconnecting feeder cables. The good channels would then try to regulate their higher post-parallel DC content to their pre-parallel values. When correcting the DC contents of their channels, the good channels may reduce the DC content on the culprit channel sensing point to below the trip threshold, and in the process some of the good channel DC content correction circuits may be saturated. This scenario is the same as discussed above, except that when the channels are split, the culprit channel would definitely trip and some of the good channels may also trip. Alternatively, the good channels may reduce the DC content on the culprit channel sensing point, but not to a level below the trip threshold, and in the process most of the good channels will have their DC content correction control saturated, with the DC content at their sensing points possibly beyond the trip thresholds. In this instance, an out-of-limit DC content will exist on at least one channel sensing point. If the selective isolation of the culprit channel cannot be implemented, the system will be forced to split and all channels will operate in the isolated mode. Here again, the culprit channel will definitely trip and some of the good channels may also trip.

It can therefore be seen that upon taking a good channel off of a paralleled bus, that channel could falsely trip because of a saturated DC content control. Furthermore, when splitting a paralleled system because of excessive DC content, not only the culprit channel, but also some of the good channels may be tripped. It is therefore desirable to provide a DC content control circuit which permits selective tripping of defective channels in a parallel connected VSCF power system.

SUMMARY OF THE INVENTION

This invention provides a method of selectively isolating faulty channels in an electrical power system, having at least two controllable AC power sources connected for parallel operation, wherein: a DC content signal, representative of the magnitude of a DC voltage in the AC output of one of the power sources, is produced and is combined with a differential current signal, representative of the differential DC current flowing in connected phases of the power sources. An error signal, produced by this combination, is used to control the operation of the first power source to reduce the magnitude of DC voltage on the system output bus. If the error signal exceeds a predetermined threshold level, a trip signal is produced. The trip signal may be used to selectively trip a defective power source. If the channels of the power system are to be run in a split, or isolated mode, the combination of the DC content signals and differential current signals is prevented such that the error signal is representative of the DC content signal only.

This invention also encompasses a circuit which performs the above DC content control method.

BRIEF DESCRIPTION OF THE DRAWINGS

The invention will become more readily apparent from the following description of the preferred embodiment thereof, shown by way of example only, in the accompanying drawings wherein.

DESCRIPTION OF THE PREFERRED EMBODIMENT

Figure 1A:
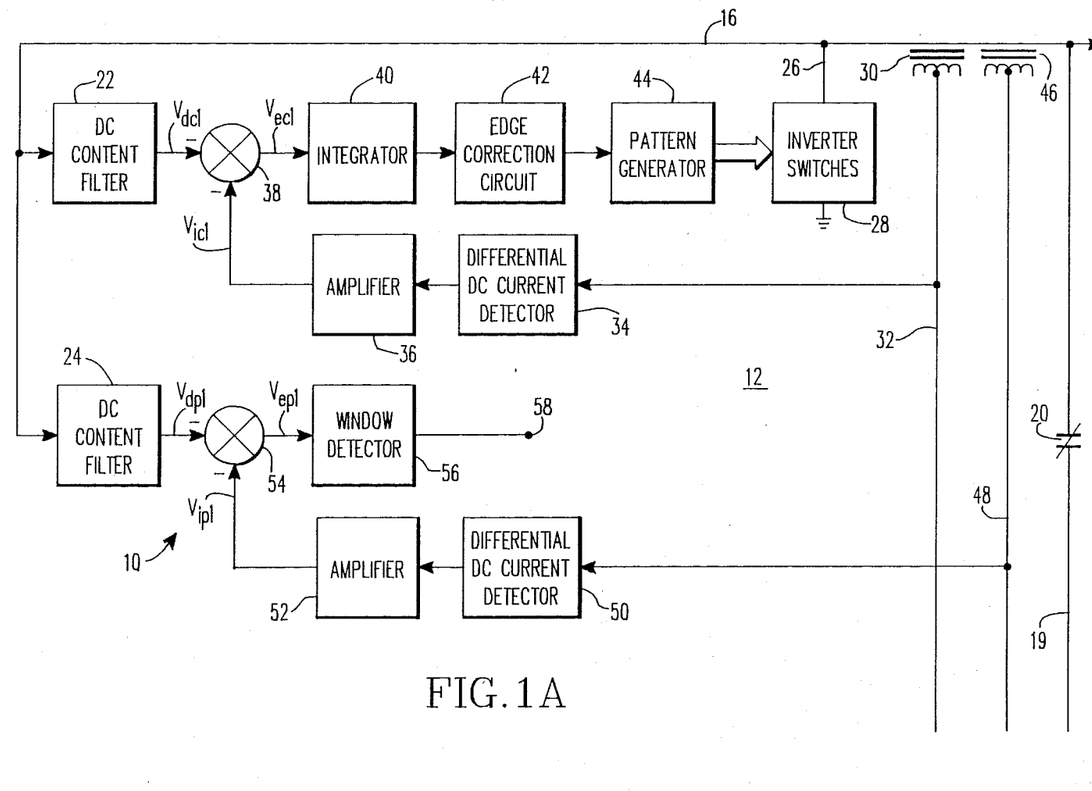
FIGS. 1A and 1B show a block diagram of a parallel VSCF power system which incorporates the present invention.
Figure 1B:
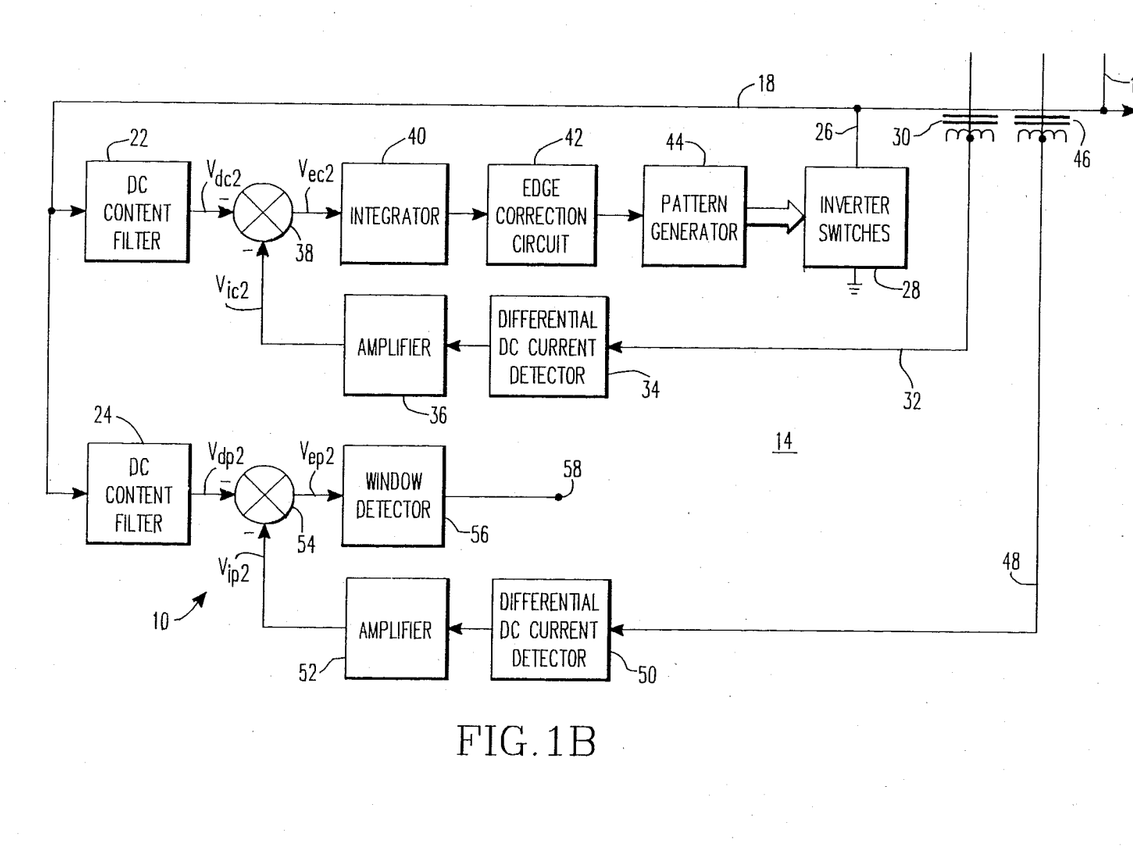

Referring to the drawings, FIGS. 1A and 1B show a block diagram of a two channel parallel VSCF power system which includes a DC content control circuit constructed in accordance with one embodiment of the present invention. The parallel power system 10 includes a pair of VSCF channels 12 and 14. Channel 12 produces a multiple phase output AC voltage on bus 16 while channel 14 produces a multiple phase AC output on bus 18. For parallel operation, these supply buses are connected via feeder 19 by contacts 20 of a bus tie breaker. Since the channels contain identical components, identical item numbers will be used to identify the elements of each channel. In the following discussion, voltage signals are identified by the letter V with an attached subscript. If no number appears in the subscript, that signal designation applies to both channels. If a "1" occurs in the subscript, that signal applies to channel 12 and a "2" in the subscript indicates that the signal applies to channel 14.

Each channel includes a pair of DC content filters 22 and 24 which are connected to the output 26 of a plurality of inverter switches 28. Filter 22 produces a voltage signal $V_{dc}$ which is representative of the DC content of the output voltage of each channel. Similarly, filters 24 produce a voltage signal $V_{dp}$ that is representative of the DC content of the output voltage. The DC content control loop of each channel includes current sensors 30 which are inductively coupled to corresponding output phases of each channel. The current sensors of corresponding phases are electrically connected in series with each other to produce a signal on lines 32 which is proportional to the differential current flowing in corresponding phase conductors of the two channels. This signal is detected by a differential DC current detector 34 and amplified by amplifier 36 to produce a differential current signal $V_{ic}$ that is representative of the differential current flowing in connected phases of the power sources. In each channel, the DC content signal $V_{dc}$ and the differential current signal $V_{ic}$ are combined in summation point 38 to produce an error signal $V_{ec}$. This error signal is fed to integrator 40 and the resulting integrated signal is used by an edge correction circuit 42 to control the inverter switch pattern produced by pattern generator 44. The edge correction and pattern generation is accomplished in accordance with known techniques such as that illustrated in U.S. Pat. No. 4,443,842.

Each channel of the parallel system 10 is also provided with a protection circuit including current sensors 46 which are inductively coupled to corresponding phases of the outputs of each channel and electrically connected in series to produce a signal on line 48 which is representative of the differential current flowing in corresponding phases of the parallel channels. This signal is detected by differential current detector 50 and amplified by amplifier 52 to produce a signal $V_{ip}$ which is representative of the differential current flowing in corresponding phases of the channel outputs. DC content filters 24 produce a signal $V_{dp}$ which is representative of the DC content in the respective channel outputs. The DC content signal $V_{dp}$ and the differential current signal $V_{ip}$ are combined in summing points 54 to produce a second error signal $V_{ep}$. A window detector 56 compares this signal to a predetermined threshold level and produces an output at terminal 58 when the predetermined threshold level is exceeded.

It should be understood that the DC content filters 22, the integrators 40, the edge correction circuits 42, the pattern generators 44 and the inverter switches 28 are all found in previously-existing single channel DC content control systems. This invention adds the combination of the differential current signal with the DC content signal in a negative feedback control fashion to achieve DC content control and selective tripping of failed channels.

During normal non-failed operation, it is evident from FIG. 1 that the sum of $V_{dc}+V_{ic}$ must equal zero. Otherwise, an error signal $V_{ec}$ would be produced which would cause an adjustment in the inverter switching pattern to produce zero voltage at the integrator input. Thus, we conclude that:

$$V_{ic}+V_{dc}=0 \tag{1}$$

$$V_{dc}=-V_{ic} \tag{2}$$

The relative values of DC content at the pole voltages and differential DC current are dependent upon the relative loop gains of the DC content control and differential current control loops. For effective DC content control of the parallel system, the differential current loop will have a higher loop gain than that of the DC content voltage loop.

The differential current control loop tries to drive the differential current to zero, by minimizing any amplitude differences between the DC pole voltages of the paralleled inverters. A positive differential current signal $V_{ic}$ would mean that the channel is sourcing current into the other channel, so $V_{ic}$ is applied in a direction which makes the sensed DC voltage droop with respect to other channels and hence reduces the differential DC current.

The DC content protection circuit containing circuits 24, 50, 52 and 56, is similar to the DC content control circuit. The protection circuit has its own set of current sensors and senses the total difference DC current signal independently of the DC content control circuit. It checks the sum of the differential DC current signal $V_{ip}$ and the voltage signal $V_{dp}$. Any deviation from zero would indicate a problem in the DC content control circuit. The DC content control and protection loop equations are as follows:

$$V_{dc} + V_{ic} = 0 \tag{3}$$

$$V_d + V_i = 0 \tag{4}$$

During abnormal operating conditions, equation (4) becomes:

$$V_{dp} + V_{ip} \neq 0 \tag{5}$$

During split mode operation, the differential current control loop will be disabled, so that DC content trip time delays are derived only from the sensed DC voltage. During parallel operation, the same trip time delay circuit is used, however, the sum of the sensed DC voltage and differential current signals is used to feed the trip circuit.

Figure 2A:
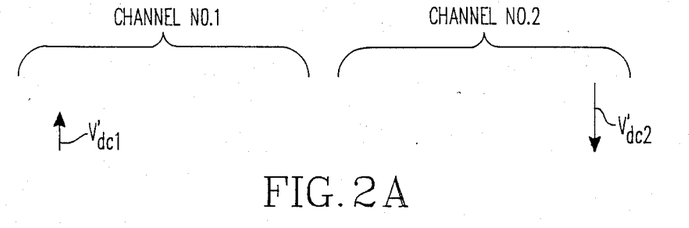
FIGS. 2A, 2B, 2C and 2D are a series of vectors which may be used to explain the operation of the present invention.
Figure 2B:
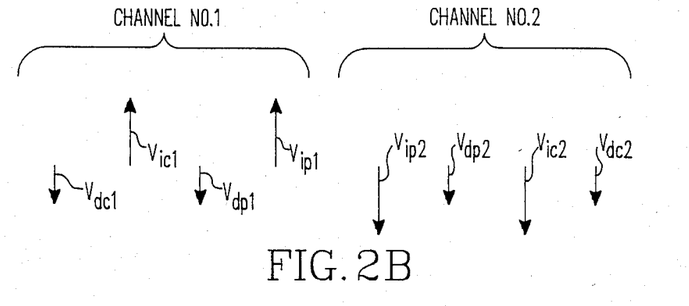

The equations shown above assume no offset error in the control loop. Offset error represents pre-paralleled DC content on the pole output voltages. In the parallel mode, the DC content on the paralleled bus will be the average of the pre-paralleled DC content of all channels on the parallel bus. The normal and abnormal situations can be clarified with the help of the voltage vector diagrams shown in FIGS. 2A, 2B, 2C and 2D. The vectors of FIGS. 2A and 2B represent two good channels having pre-paralleled DC content, represented by signals $V'_{dc1}$ and $V'_{dc2}$, which is below the trip threshold level. After the bus tie breaker contacts close, the post parallel voltage signals of FIG. 2B are produced. The post parallel DC content signals will be the average of the pre-paralleled DC content signals. The pre-parallel signals are due to offset voltages of operational amplifiers and component tolerances in the control loop. The DC content loop control/protection equations for normal parallel operation are as follows:

$$V_{dc} + V_{ic} - V_{dc} = 0 \tag{6}$$

$$V_{dc} + V_{ic} = V_{dc} \tag{7}$$

$$V_{dc} = (V'_{dc1} + V'_{dc2})/2 \tag{8}$$

$$V_{dp} + V_{ip} = V_{dc} \tag{9}$$

The protection circuit will detect an error voltage in the DC content control loop. The detected error voltage would equal the pre-paralleled DC content, which is below the trip threshold level. Therefore, the DC content trip will not be enabled, indicating that the DC content control loop is functioning properly.

Figure 2C:
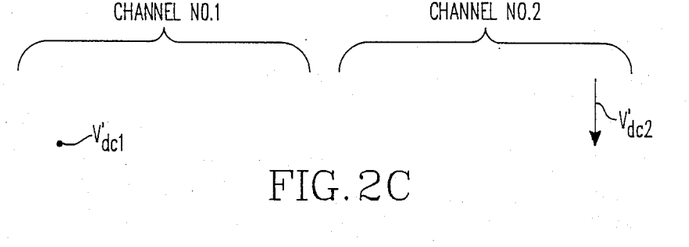
Figure 2D:
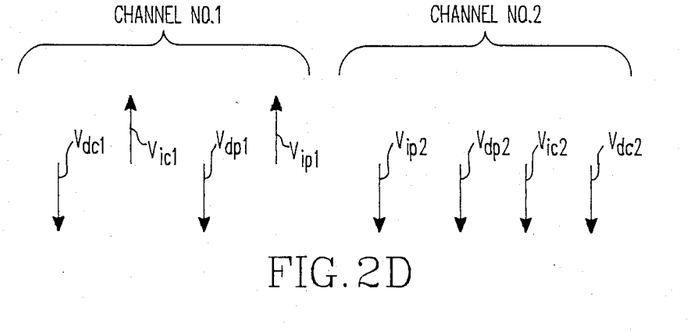

Next consider, for example, a problem in the DC content control loop of channel 14 in FIG. 1. This situation is illustrated by the vector diagrams of FIGS. 2C and 2D. The pre-parallel condition is shown by the vectors of FIG. 2C. The large DC content signal $V'_{dc2}$ would result in large DC currents when the channels are paralleled as illustrated by FIG. 2D. This large DC current will be sensed by the control circuit. The control circuit will attempt to adjust the DC voltages on its sensing points so as to reduce the DC current to zero.

Figure 3A:
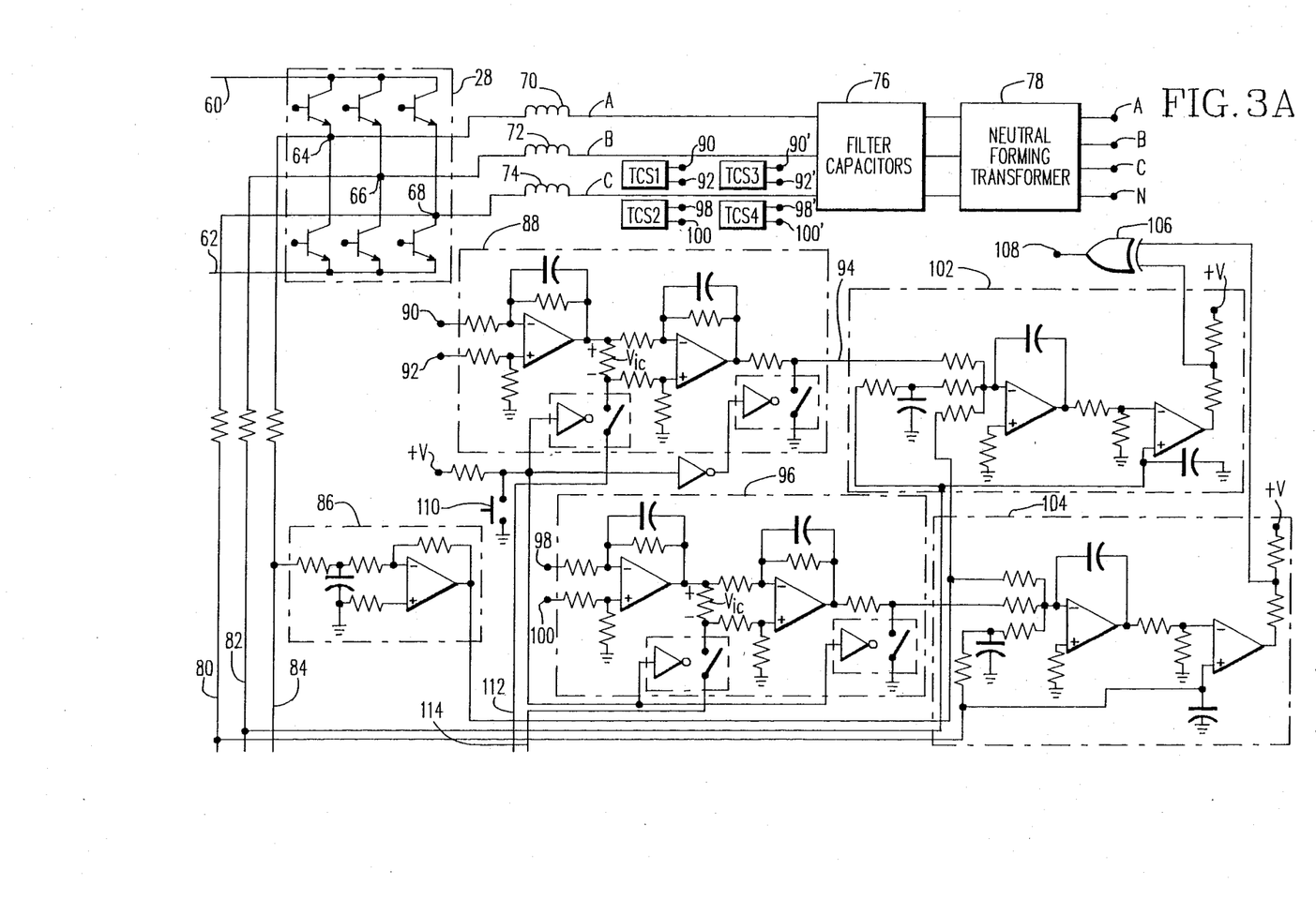
FIGS. 3A and 3B are schematic diagrams of circuits which are constructed in accordance with one embodiment of the present invention.
Figure 3B:
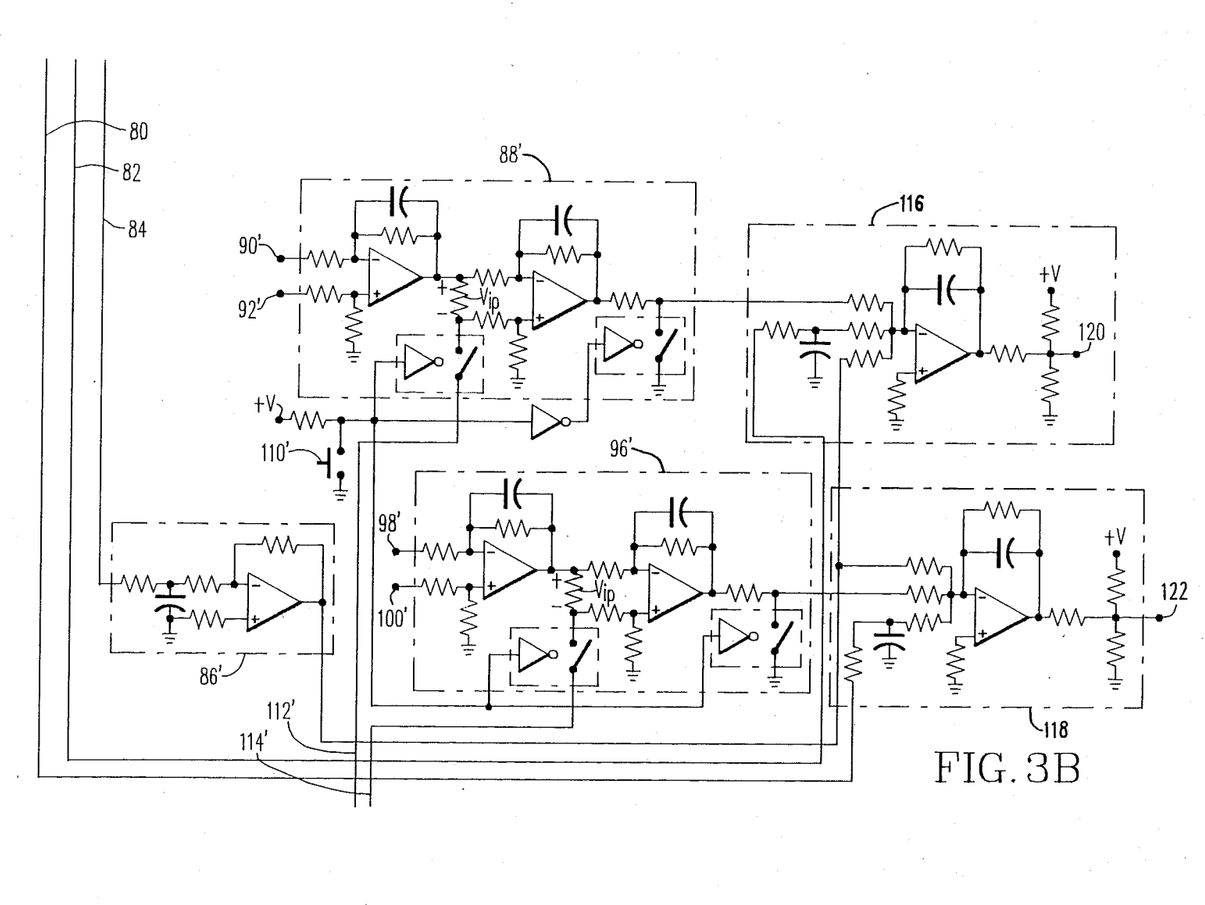

The system will finally stabilize itself with the DC content being equal to the average of the pre-paralleled DC contents. With $V'_{dc2}$ being equal to the sum of $V_{dc2} + V_{ic2}$. The relative magnitudes of $V_{dc2}$ and $V_{ic2}$ are related to the gains of the DC content voltage control loop and differential DC current loop. As shown in FIG. 3D, it is apparent that:

$$V_{ic1} = V_{ip1} \tag{10}$$

$$V_{ic2} = V_{ip2} \tag{11}$$

$$V_{dc1} = V_{dc2} = (V'_{dc1} + V'_{dc2})/2 \tag{12}$$

$$V_{dc1} = V_{dp1} \tag{13}$$

$$V_{dc2} = V_{dp2} \tag{14}$$

$$V_d + V_{ip1} = 0 \tag{15}$$

$$V_{dp2} + V_{ip2} \neq 0 \tag{16}$$

Note that for channel No. 2, $V_{dp2}$ and $V_{ip2}$ are in the same direction and do not add to zero. The protection circuit will detect the problem in channel No. 2 and will enable the trip time delay. This will isolate channel No. 2 from the parallel bus when the sum of $V_{dp2}$ and $V_{ip2}$ exceeds the predetermined threshold level. FIGS. 3A and 3B contain schematic diagrams of the control circuits of one channel of a power system of FIG. 1. A DC voltage on DC link conductors 60 and 62 is switched by inverter switches 28 to produce a constant frequency three-phase AC output on power poles 64, 66 and 68. A three-phase AC output appearing at the power poles is filtered by inductors 70, 72 and 74 and by filter capacitors 76. A neutral forming transformer 78 is used to provide a four wire output. The power pole output voltage is sensed on lines 80, 82 and 84. Amplifier circuit 86 receives the phase A voltage on line 84 and produces an output signal which is representative of that voltage. Lines 112 and 114 are provided for connection to the control circuits of phases B and C respectively of other channels. Circuit 88 receives a first voltage input signal from current sensor TCS1 on lines 90 and 92, and a second voltage signal from a current sensor coupled to phase B of the other channel via line 112. Circuit 88 produces a differential current output signal on line 94. Circuit 96 receives a first voltage signal from current sensor TCS2 on lines 98 and 100, and a second voltage signal from a current sensor coupled to phase C of the other power system channel, via line 114. The outputs of circuits 86, 88 and 96 are received, combined and integrated by circuits 102 and 104. This results in a pair of signals which are fed to exclusive OR gate 106 to produce a signal on terminal 108 that is used by the edge correction circuit 42. Switch 110 is opened to disable circuits 88 and 96 when the system is operating in the split, or non-parallel mode, so that the switching pattern is only affected by the DC voltage level sensed by circuit 86.

The protection loop illustrated by the circuit of FIG. 3B contains several circuits which are similar to the DC content control loop of FIG. 3A. Therefore, similar numbers in FIGS. 3A and 3B have been used to indicate similar elements. In FIG. 3B, the outputs of circuits 86', 88' and 96' are combined and integrated by circuits 116 and 118 to produce signals on terminals 120 and 122 that are connected to the window detector circuit 56. The window detector may be constructed in accordance with known techniques such as illustrated in FIG. 4 of Pat. No. 4,731,690.

Figure 4:
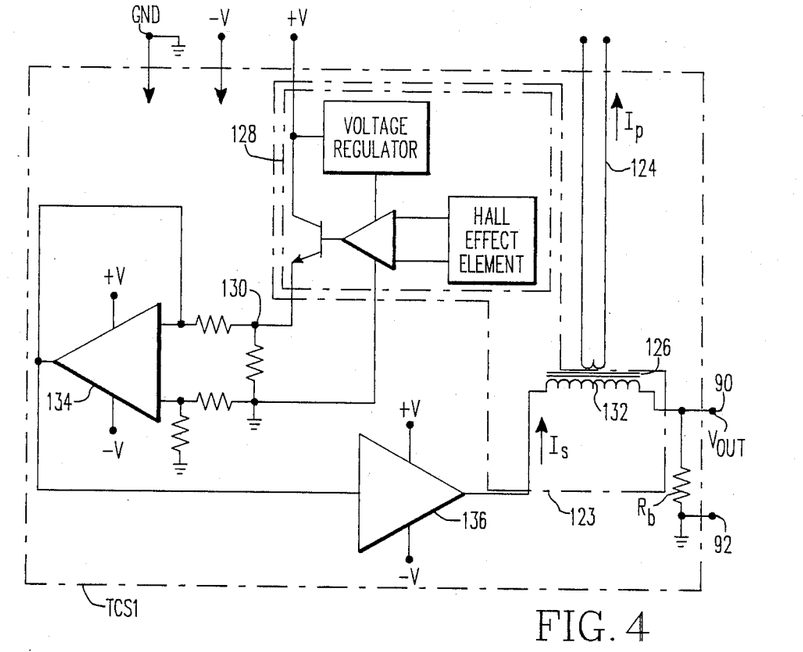
FIG. 4 is a schematic diagram of a total current sensor used in the circuit of FIG. 3A.
Figure 5:
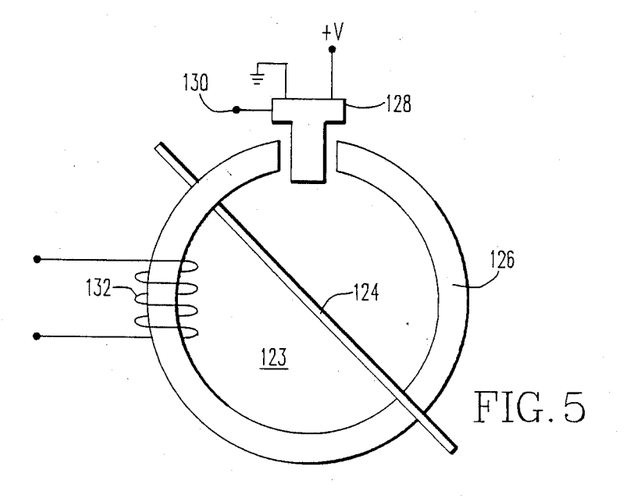
FIG. 5 is a schematic diagram of the current sensor element used in the total current sensor of FIG. 4.

FIG. 4 is a schematic diagram of one of the total current sensors TCS1, TCS2, TCS3 and TCS4 of FIG. 3A. A schematic diagram of the current transducer 123 used in the circuit of FIG. 4 is illustrated in FIG. 5. The phase conductor 124, which may be a conductor of either phase A, B or C in an output bus of one of the channels, passes through a generally circular magnetic core 126. A commercially available linear output Hall effect transducer 128 is positioned within a gap in core 126 and produces an output voltage at terminal 130 which is proportional to the DC current flowing in phase conductor 124. The Hall effect device detects magnetic flux in the core, caused by current flowing in conductor 124. This flux is nulled by adjusting the current through a null winding 132 in a closed loop manner. The following equations can be derived from the circuits of FIG. 4:

$$I_p = I_s \times N \tag{17}$$

$$V_{out} = (I_p \times R)/N \tag{18}$$

$$V_{out} \propto I_p \tag{19}$$

where, $I_p$ is the current flowing in the phase conductor, $I_s$ is the sensed current, N is the number of turns in winding 132, $V_{out}$ is the voltage across resistor $R_b$ and R is the resistance of resistor $R_b$. Linear output Hall effect transducers such as item No. 128 can be used to sense currents ranging from 250 milliamps to thousands of amps. The isolated analog voltage produced by the transducer can be modified by adding amplifiers, such as 134 and 136, to achieve level shifting, temperature compensation, gain changes or other desired parameters. Linear transducers offer both high frequency response and DC measurements.

It should now be apparent that the present invention achieves both DC content control and protection functions through the use of differential current feedback loops. Although the present invention has been described in terms of what is at present believed to be its preferred embodiment, it will be apparent to those skilled in the art that various changes may be made without departing from the scope of the invention. It is therefore intended that the following claims include such changes.

What is claimed is:

1. A circuit for selectively isolating faulty channels in an electrical power system, having at least two controllable AC power sources connected for parallel operation, said circuit comprising:
   means for producing a DC content signal representative of the magnitude of DC voltage in the AC output of a first one of said power sources;
   means for producing a differential current signal representative of the differential DC current flowing in connected phases of said power sources;
   means for combining said DC content signal and said differential current signal to produce an error signal;
   means for controlling the operation of said first power source in response to said error signal to reduce the magnitude of said DC voltage; and
   means for producing a trip signal when said error signal exceeds a predetermined threshold level.

2. A circuit as recited in claim 1, further comprising:
   means for electrically isolating corresponding phases of said power sources; and
   means for preventing the combination of said DC content signal and said differential current signal when said corresponding phases are isolated, such that said error signal is representative of said DC content signal only.

3. A circuit as recited in claim 1, further comprising:
   means for producing a second DC content signal representative of the magnitude of a second DC voltage in the AC output of a second one of said power sources;
   means for combining said second DC content signal and said differential current signal to produce a second error signal;
   means for controlling the operation of said second power source in response to said second error signal to reduce the magnitude of said second DC voltage; and
   means for producing a second trip signal when said second error signal exceeds said predetermined threshold level.

4. A method of selectively isolating faulty channels in an electrical power system, having at least two controllable AC power sources connected for parallel operation, said method comprising the steps of:
   producing a DC content signal representative of the magnitude of DC voltage in the AC output of a first one of said power sources;
   producing a differential current signal representative of the differential DC current flowing in connected phases of said power sources;
   combining said DC content signal and said differential current signal to produce an error signal;
   controlling the operation of said first power source in response to said error signal to reduce the magnitude of said DC voltage; and
   producing a trip signal when said error signal exceeds a predetermined threshold level.

5. A method as recited in claim 4, further comprising the steps of:
   electrically isolating corresponding phases of said power sources; and
   preventing the combination of said DC content signal and said differential current signal when said corresponding phases are isolated, such that said error signal is representative of said DC content signal only.

6. A method as recited in claim 4, further comprising the steps of:
   producing a second DC content signal representative of the magnitude of a second DC voltage in the AC output of a second one of said power sources;
   combining said second DC content signal and said differential current signal to produce a second error signal;
   controlling the operation of said second power source in response to said second error signal to reduce the magnitude of said second DC voltage; and
   producing a second trip signal when said second error signal exceeds said predetermined threshold level.

* * * * *